United States Patent
Santosuosso (10) Patent No.: US 7,925,642 B2
(45) Date of Patent: Apr. 12, 2011

(54) APPARATUS AND METHOD FOR REDUCING SIZE OF INTERMEDIATE RESULTS BY ANALYZING HAVING CLAUSE INFORMATION DURING SQL PROCESSING

(75) Inventor: John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1326 days.

(21) Appl. No.: 11/149,489

(22) Filed: Jun. 9, 2005

(65) Prior Publication Data

US 2006/0282420 A1 Dec. 14, 2006

(51) Int. Cl.
G06F 7/00 (2006.01)
G06F 17/30 (2006.01)
(52) U.S. Cl. ........................................ 707/713; 707/715
(58) Field of Classification Search ............... 705/14, 705/27, 35; 707/1–6, 8, 10, 100, 101, 102, 707/104.1, 201, 203, 204
See application file for complete search history.

(56) References Cited

U.S. PATENT DOCUMENTS

| | | | | |
|---|---|---|---|---|
| 5,812,840 | A * | 9/1998 | Shwartz ........................... | 1/1 |
| 5,873,098 | A | 2/1999 | Bamford et al. | |
| 6,041,344 | A * | 3/2000 | Bodamer et al. ............... | 709/203 |
| 6,338,056 | B1 * | 1/2002 | Dessloch et al. ............... | 707/711 |
| 6,356,888 | B1 * | 3/2002 | Egan et al. ..................... | 707/715 |
| 6,424,980 | B1 * | 7/2002 | Iizuka et al. ................... | 715/206 |
| 6,480,836 | B1 * | 11/2002 | Colby et al. ................... | 707/717 |
| 6,785,668 | B1 * | 8/2004 | Polo et al. ...................... | 707/771 |
| 7,181,450 | B2 * | 2/2007 | Malloy et al. .................. | 1/1 |
| 2003/0055814 | A1 * | 3/2003 | Chen et al. ..................... | 707/3 |
| 2003/0195881 | A1 * | 10/2003 | Koo et al. ...................... | 707/5 |
| 2005/0210023 | A1 * | 9/2005 | Barrera et al. .................. | 707/5 |

OTHER PUBLICATIONS

Research Disclosure, Feb. 2001, pp. 319-320, "Multiple-column sorting controls".
IBM Technical Disclosure Bulletin, vol. 33, No. 3B, Aug. 1990, pp. 407-408, "Improved query understanding through the use of a group by window".
IBM Technical Disclosure Bulletin, vol. 33, No. 3B, Aug. 1990, pp. 418-419, "Improved query understanding through the use of a having window".
IBM Technical Disclosure Bulletin, vol. 35, No. 4A, Sep. 1992, pp. 314-317, "Optimization of like predicate in an SQL query".

* cited by examiner

*Primary Examiner* — Charles Rones
*Assistant Examiner* — Daniel Kuddus
(74) *Attorney, Agent, or Firm* — Martin & Associates, LLC; Derek P. Martin (57) ABSTRACT

A query processor includes a HAVING clause processing mechanism that processes the HAVING clause in a query when generating the intermediate results, instead of generating the intermediate results without regard to the HAVING clause, then applying the HAVING clause to the intermediate results. As a result, the size of the intermediate results may be significantly reduced, and effort is not wasted in placing data into the intermediate results in one step that would be removed were the HAVING clause processed separately.

3 Claims, 9 Drawing Sheets

FIG. 1 employeeTable 200

| recNo | deptNumber | salary | location | other data |
|---|---|---|---|---|
| 1 | 5 | 50000 | PA | |
| 2 | 4 | 100000 | MN | |
| 3 | 5 | 100000 | MN | |
| 4 | 1 | 50000 | MN | |
| 5 | 2 | 50000 | PA | |
| 6 | 3 | 75000 | MN | |
| 7 | 3 | 100000 | MN | |
| 8 | 4 | 100000 | MN | |
| 9 | 5 | 250000 | MN | |
| 10 | 1 | 100000 | TX | |
| 11 | 2 | 75000 | TX | |
| 12 | 4 | 80000 | MN | |
| 13 | 4 | 80000 | MN | |
| 14 | 4 | 80000 | MN | |
| 15 | 4 | 80000 | MN | |
| 16 | 1 | 100000 | MN | |
| 17 | 3 | 200000 | MN | |
| 18 | 1 | 100000 | MN | |
| 19 | 1 | 80000 | MN | |
| 20 | 1 | 100000 | MN | |
| 21 | 4 | 100000 | MN | |
| 22 | 3 | 100000 | MN | |
| 23 | 2 | 100000 | MN | |
| 24 | 5 | 100000 | MN | |
| 25 | 4 | 100000 | MN | |
| 26 | 3 | 100000 | MN | |
| 27 | 3 | 100000 | MN | |
| 28 | 3 | 100000 | MN | |
| 29 | 4 | 100000 | MN | |
| 30 | 6 | 100000 | NJ | |
| 31 | 7 | 200000 | NJ | |
| 32 | 8 | 100000 | NJ | |
| 33 | 2 | 100000 | MN | |

FIG. 2

Select deptNumber, count(*), sum(salary)
from employeeTable
group by deptNumber
Having count(*) > 8

| deptNumber | count(*) | sum(salary) |
|---|---|---|
| 1 | 6 | 530000 |
| 2 | 4 | 325000 |
| 3 | 7 | 775000 |
| 4 | 9 | 820000 |
| 5 | 4 | 500000 |
| 6 | 1 | 100000 |
| 7 | 1 | 200000 |
| 8 | 1 | 100000 |

FIG. 10 personalInfoTable

| deptNumber | expectedRaise |
|---|---|
| 1 | 5000 |
| 2 | 5000 |
| 3 | 5000 |
| 4 | 7500 |
| 5 | 5000 |
| 6 | 10000 |
| 7 | 5000 |
| 8 | 5000 |

FIG. 11

Select deptNumber, count(*), sum(salary)
from employeeTable, personalInfoTable
a.deptNumber = b.deptNumber
group by deptNumber
Having count(*) > 8

FIG. 12

| deptNumber | count(*) | sum(salary) | sum(expectedRaise) |
|---|---|---|---|
| 1 | 6 | 530000 | 30000 |
| 2 | 4 | 325000 | 20000 |
| 3 | 7 | 775000 | 35000 |
| 4 | 9 | 820000 | 67500 |
| 5 | 4 | 500000 | 20000 |
| 6 | 1 | 100000 | 10000 |
| 7 | 1 | 200000 | 5000 |
| 8 | 1 | 100000 | 5000 |

FIG. 13    Prior Art

| deptNumber | count(*) | sum(salary) | sum(expectedRaise) |
|---|---|---|---|
| 4 | 9 | 820000 | 67500 |

FIG. 14

Select deptNumber, count(*), sum(salary)
from employeeTable, personalInfoTable
where location=? and
a.deptNumber = b.deptNumber
group by deptNumber
Having count(*) > 8

APPARATUS AND METHOD FOR REDUCING SIZE OF INTERMEDIATE RESULTS BY ANALYZING HAVING CLAUSE INFORMATION DURING SQL PROCESSING

BACKGROUND OF THE INVENTION

1. Technical Field

This invention generally relates to computer systems, and more specifically relates to apparatus and methods for processing database queries.

2. Background Art

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A query usually specifies conditions that apply to one or more columns of the database, and may specify relatively complex logical operations on multiple columns. The database is searched for records that satisfy the query, and those records are returned as the query result. Structured Query Language (SQL) is one specific query language that may be used to query a database.

An SQL query typically includes a "SELECT" statement or clause that specifies what data is desired. SQL also includes a construct known as a "HAVING" clause that may specify additional restrictions on the data. When an SQL query has a HAVING clause, the SELECT clause is processed first to generate intermediate results, typically in the form of a temporary table. The HAVING clause is then applied to the intermediate results to generate the result set for the query. Sometimes the HAVING clause significantly reduces the amount of data in the intermediate results. In these cases, the database engine goes to significant work to assemble data into the intermediate results, only to discard much of the data once the HAVING clause is processed. Without a way to take the HAVING clause into account while generating the intermediate results, the database industry will continue to suffer from inefficient methods for processing queries with a HAVING clause.

DISCLOSURE OF INVENTION

According to the preferred embodiments, a query processor includes a HAVING clause processing mechanism that processes the HAVING clause in a query when generating the intermediate results, instead of generating the intermediate results without regard to the HAVING clause, then applying the HAVING clause to the intermediate results. As a result, the size of the intermediate results may be significantly reduced, and effort is not wasted in placing data into the intermediate results in one step that would be removed were the HAVING clause processed separately.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

1.0 Overview

The present invention relates to the processing of database queries. For those not familiar with databases or queries, this Overview section will provide background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, lets assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix.

One popular way to define a query uses Structured Query Language (SQL). SQL defines a syntax for generating and processing queries that is independent of the actual structure and format of the database. Note that an SQL query is expressed in terms of columns defined on one or more database tables. Information about the internal storage of the data is not required as long as the query is written in terms of expressions that relate to values in columns from tables.

Known Processing of Queries that Include a HAVING Clause

In the prior art, a query that includes a HAVING clause is processed in two distinct steps. In the first step, the SELECT clause is processed, and intermediate results are generated. In the second step, the further restrictions of the HAVING clause are applied to the intermediate results. Due to this two-step process, the SELECT clause may cause large amounts of data to be placed into the intermediate results in the first step that will have to be removed in the second step. The overhead of adding data to the intermediate results when processing the SELECT clause, only to remove much of the same data when processing the HAVING clause, negatively affects system performance.

2.0 Description of the Preferred Embodiments

The preferred embodiments recognize that it is inefficient and wasteful of system resources to place data into intermediate results, only to remove that same data to generate the result set. As a result, the preferred embodiments take the HAVING clause into account when generating the intermediate results, thereby reducing the size of the intermediate results and enhancing system performance.

Figure 1:
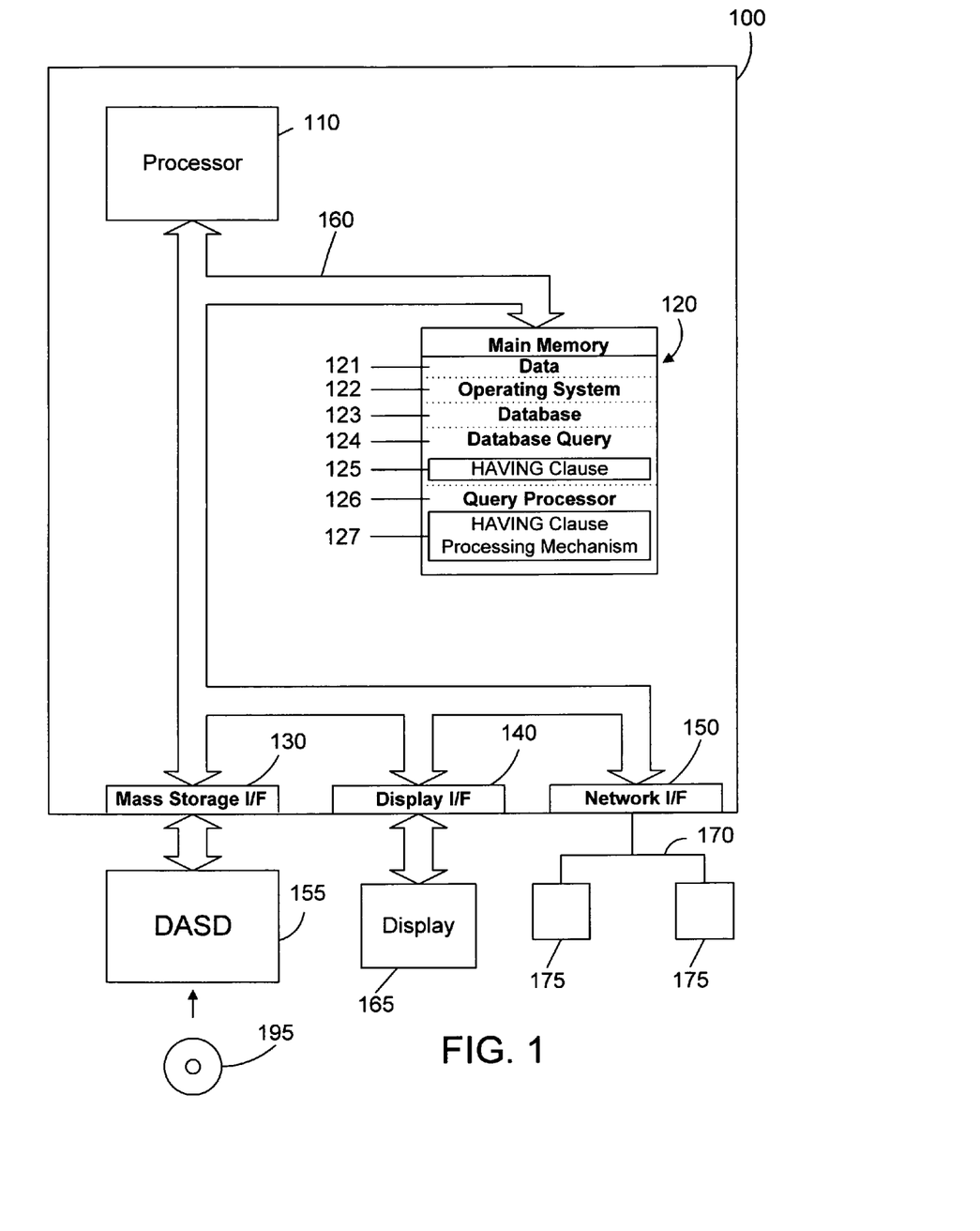
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, a database 123, one or more database queries 124, and a query processor 126. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Database 123 is any suitable database, whether currently known or developed in the future. Database 123 preferably includes one or more tables. Database query 124 is a query in a format compatible with the database 123 that allows retrieval of information stored in the database 123 that satisfies the database query 124. The preferred embodiments specifically apply to the processing of queries that include a HAVING clause 125, as shown in FIG. 1. Query processor 126 processes a database query 124, and returns a result set that satisfies the query. The query processor 126 includes a HAVING clause processing mechanism 127 that avoids the inefficiency in the two-step, prior art process of processing queries with HAVING clauses by taking the HAVING clause information into account when generating the intermediate results. By analyzing the HAVING clause while generating intermediate results, the size of the intermediate results may be greatly reduced.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, database query 124, and query processor 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiments each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links. Note that the preferred signal bearing media is tangible.

Figure 2:
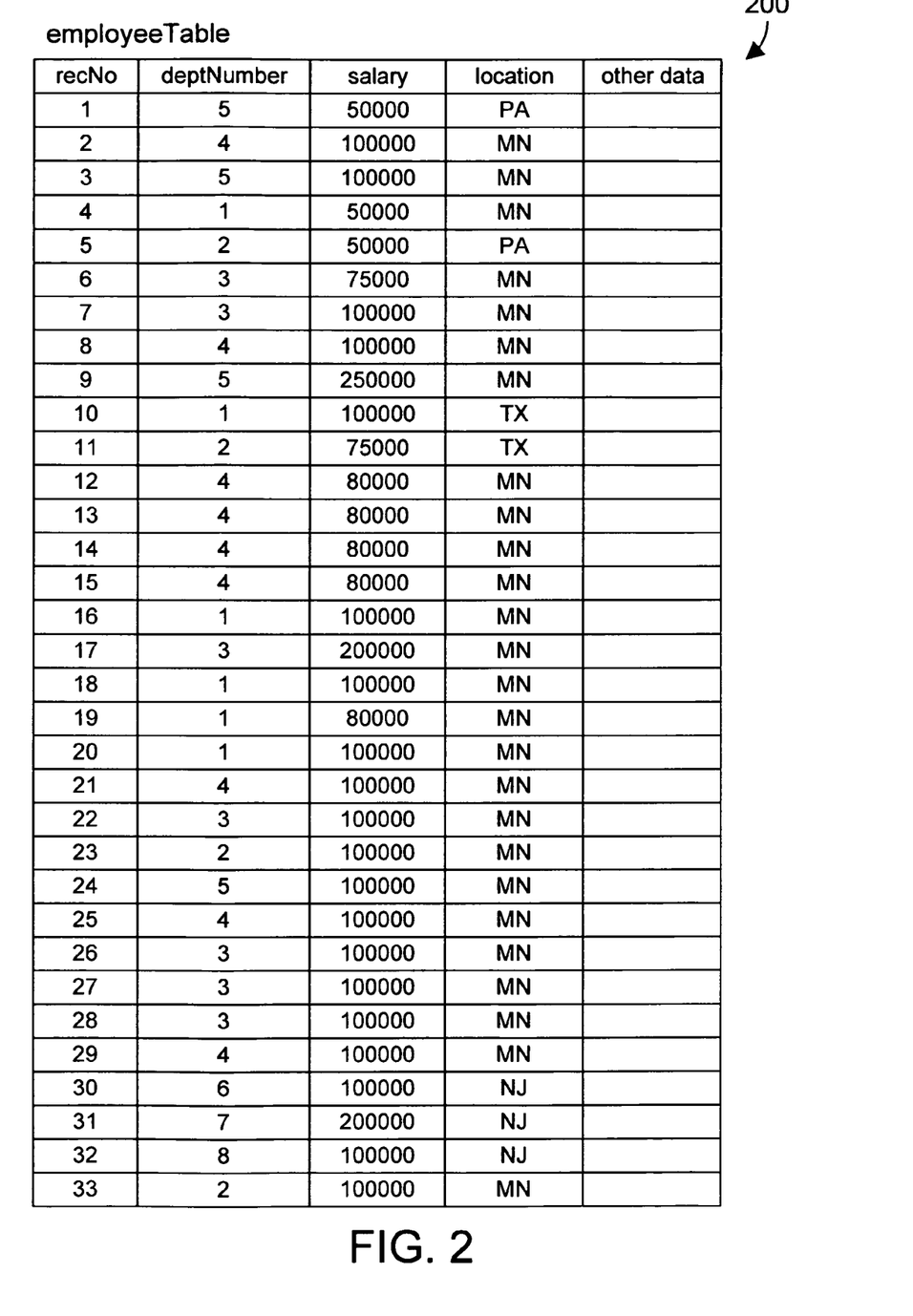
FIG. 2 is a sample database table to illustrate the concepts of the preferred embodiments.

Referring now to FIG. 2, a sample database table 200 is shown to illustrate the processing of a query in the prior art and in accordance with the preferred embodiments. Table 200 includes a deptNumber column, a salary column, a location column, and may contain other data in other columns. A record number column recNo is also shown, but this record number is used by the database engine to uniquely identify each row in the table, and does not represent user data. We now consider the query in FIG. 3. This query includes a HAVING clause. Method 400 in FIG. 4 shows a prior art method 400 for processing the query in FIG. 3. Method 400 begins when a query with a HAVING clause needs to be processed (step 410). The SELECT clause is first processed to generate intermediate results (step 420). The intermediate results are typically in the form of a temporary table. Once the temporary table is built, the HAVING clause may be applied to the temporary table to further restrict the data (step 430). The final result set may then be generated from the intermediate results (step 440). In many cases, the final result set may be the same as the intermediate results after applying the HAVING clause, requiring no processing in step 440.

Figure 3:
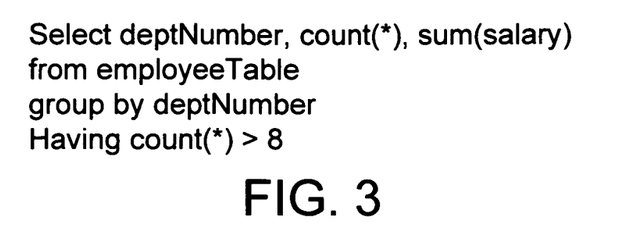
FIG. 3 is a first sample query that could be run against the table in FIG. 2.
Figure 4:
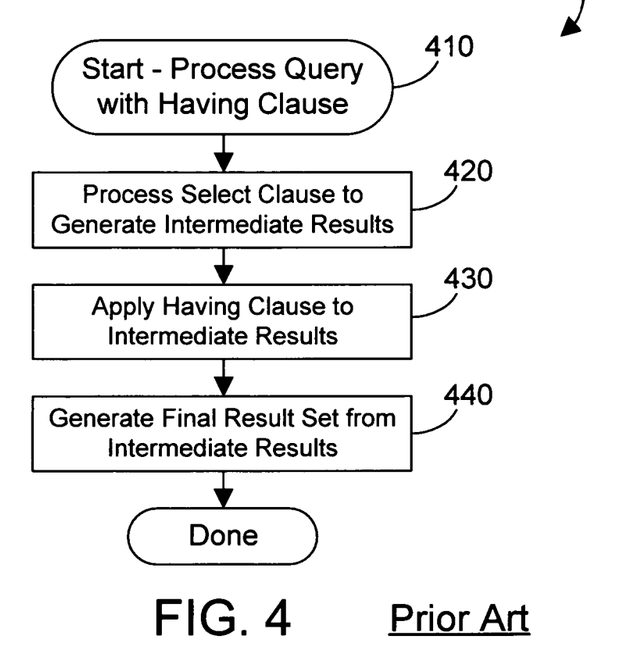
FIG. 4 is a flow diagram of a prior art method for processing the query in FIG. 3.
Figure 5:
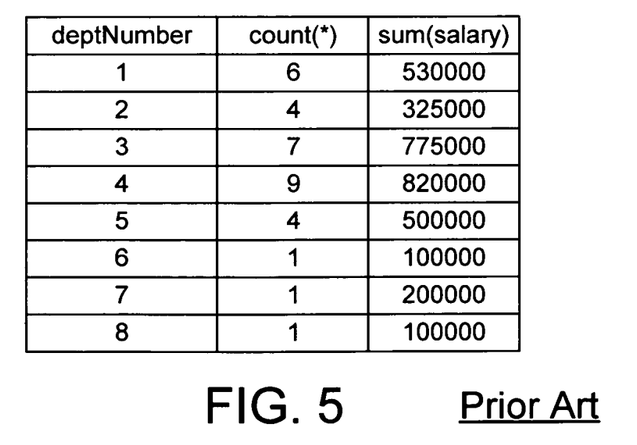
FIG. 5 is a table showing intermediate results when processing the SELECT clause of the query in FIG. 3.
Figure 6:
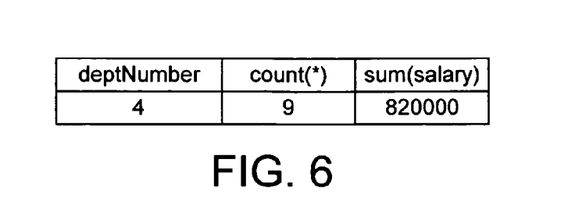
FIG. 6 is a table showing the final result set for the query in FIG. 3.

Method 400 may be applied to the query in FIG. 3 as shown in FIGS. 5 and 6. The processing of the select clause in step 420 results in the intermediate results shown in the temporary table of FIG. 5. The application of the HAVING clause to the data in the temporary table of FIG. 5 results in the final result set shown in FIG. 6. This example illustrates a problem with the prior art. Due to the separate processing of the SELECT clause and the HAVING clause, the SELECT clause may cause a large number or rows to be included in the intermediate results that will immediately be removed once the HAVING clause is processed. The result is unnecessary overhead in processing a query with a HAVING clause.

Figure 7:
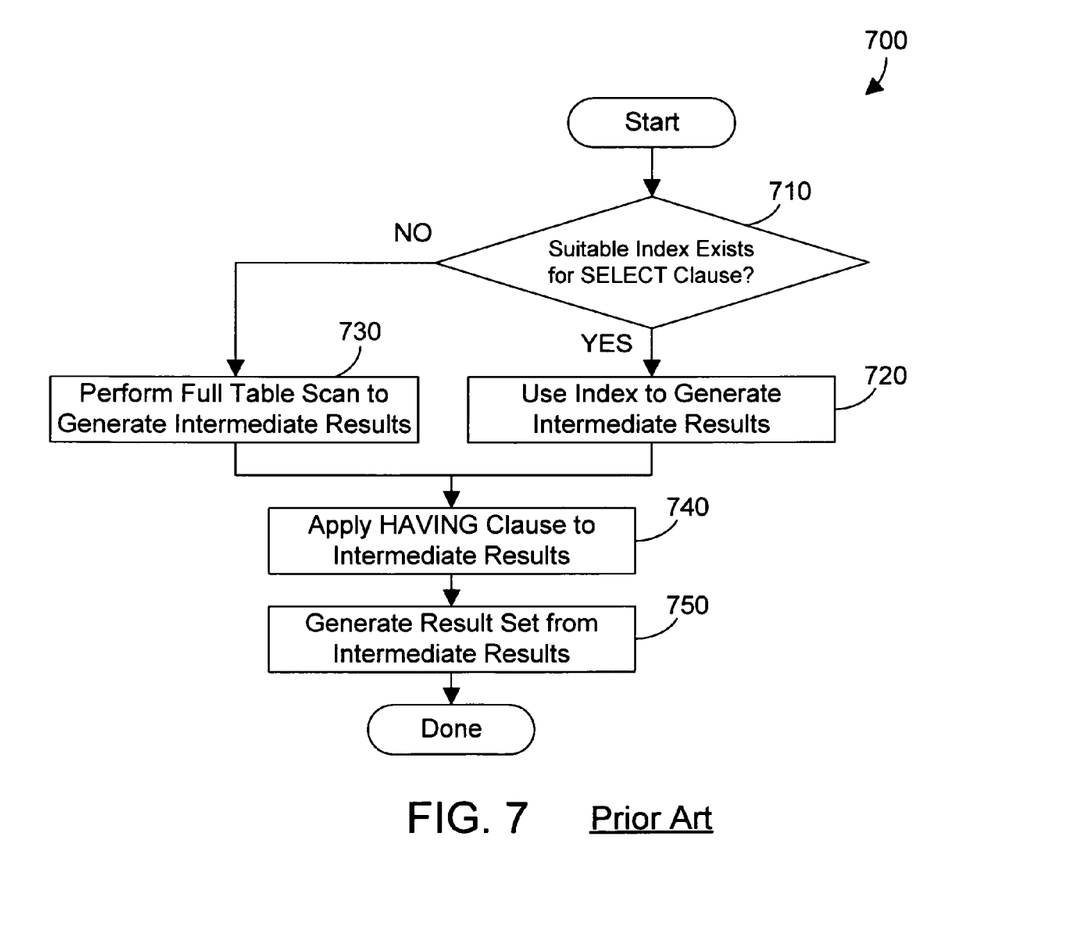
FIG. 7 is a flow diagram of a prior art method for processing a query.

Another prior art method 700 is shown in FIG. 7. This method is used when an index may exist that may speed up the execution of the query. If a suitable index exists for the SELECT clause (step 710=YES), the index may be used to generate the intermediate results (step 720). A suitable index over the deptNumber column that could be used in step 720 is shown as index 800 in FIG. 8. If no index exists for the SELECT clause (step 710=NO), a full table scan is performed to generate the intermediate results (step 730). Note that the intermediate results generated in steps 720 and 730 are the results of processing the SELECT clause before applying the HAVING clause. Thus, for the query in FIG. 3, the intermediate results shown in the temporary table of FIG. 5 are generated in both steps 720 and 730. The HAVING clause is then applied to the intermediate results in FIG. 5 (step 740), resulting in the result set shown in FIG. 6 (step 750).

Regardless of whether the intermediate results shown in FIG. 5 are generated using an index or not, many rows are still included in the temporary table of FIG. 5 that are subsequently deleted during the processing of the HAVING clause. The preferred embodiments address the inefficiency of separately processing the HAVING clause after the intermediate results have been generated. By processing the HAVING clause as part of the process that generates the intermediate results, the intermediate results will include only those rows that satisfy both the SELECT clause and the HAVING clause.

Figure 9:
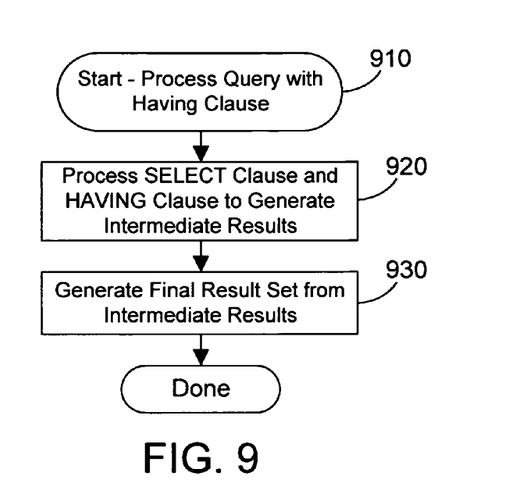
FIG. 9 is a flow diagram of a method in accordance with the preferred embodiments for processing a query that includes a HAVING clause.

Referring to FIG. 9, a method 900 in accordance with the preferred embodiments begins when a query with a HAVING clause needs to be processed (step 910). The SELECT clause and HAVING clause are processed at the same time in generating the intermediate results (step 920), which assures that only data that satisfies both the SELECT and HAVING clauses is included in the intermediate results. The final result set may then be generated from the intermediate results (step 930). Note that in many cases the intermediate results in step 920 will be the final result set, resulting in no processing in step 930.

Figure 10:
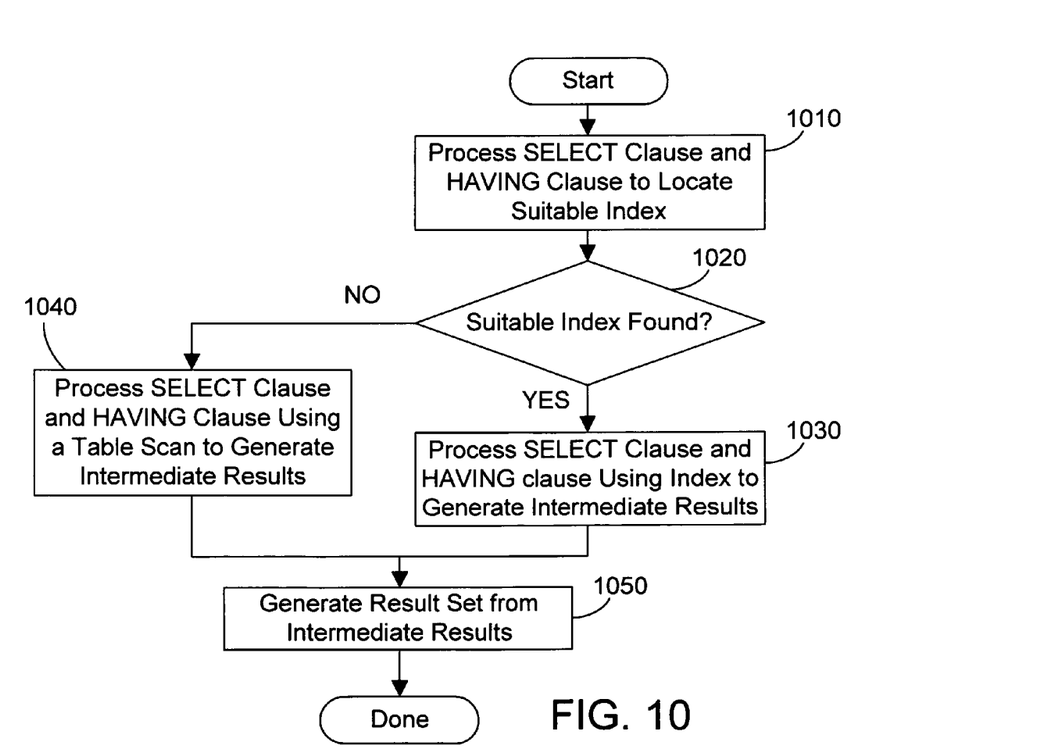
FIG. 10 is a flow diagram of a method in accordance with the preferred embodiments for processing a query that includes a HAVING clause.

FIG. 10 shows a method 1000 in accordance with the preferred embodiments that takes into account indexes in processing the database query. The SELECT clause and HAVING clause are processed to determine whether a suitable index exists (step 1010). If so (step 1020=YES), the SELECT clause and HAVING clauses are both processed using the index to generate the intermediate results (step 1030). If no suitable index is found (step 1020=NO), the SELECT clause and HAVING clauses are both processed using a table scan to generate the intermediate results (step 1040). Once the intermediate results have been generated in step 1030 or 1040, the final result set may be generated from the intermediate results (step 1050). Again, in many cases the intermediate results will be the final result set, resulting in no processing in step 1050.

When a suitable index is found in step 1020, the processing of the HAVING clause in generating the intermediate results may be simplified. For example, let's assume the index 800 in FIG. 8 exists. The index helps in processing the HAVING clause by skipping the entries in the index that do not satisfy the HAVING clause. The query processor can tell from the index that only one department, namely department 4, has enough employees to satisfy the HAVING clause. For this reason, the department numbers 1, 2, 3, 5, 6, 7 and 8 may be skipped when using the index 800 to process the query in FIG. 3. The preferred embodiments expressly extends to skipping index entries that do not satisfy the HAVING clause.

Figure 11:
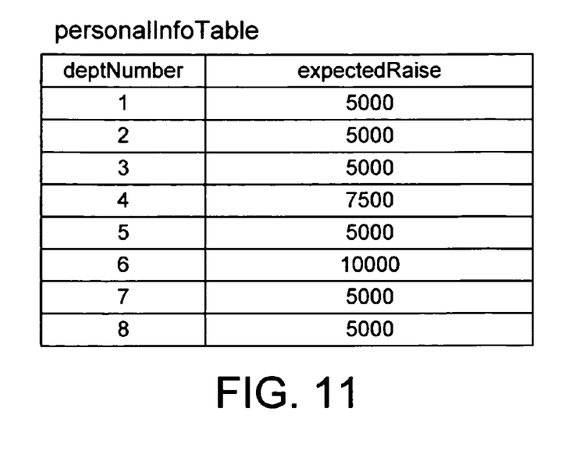
FIG. 11 is a second sample table of data.

A second example query is now presented to further illustrate the concepts of the preferred embodiments. Referring to FIG. 11, a personalInfoTable is shown with a column expectedRaise that corresponds to a department number of the employee. We now consider a second sample query shown in FIG. 12, which references the employeeTable in FIG. 2 as well as the personalInfoTable in FIG. 11. Because this query requires the employeeTable and personalInfoTable to be joined, the preferred embodiments illustrate that many join operations that would be performed in the prior art may be avoided by processing the SELECT clause and HAVING clause at the same time to generate the intermediate results.

Figure 12:
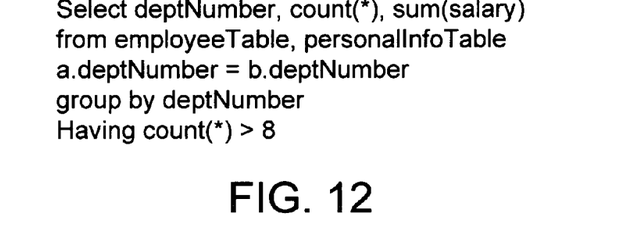
FIG. 12 is a second sample query that specifies joining the table of FIG. 2 with the table of FIG. 11.
Figure 13:
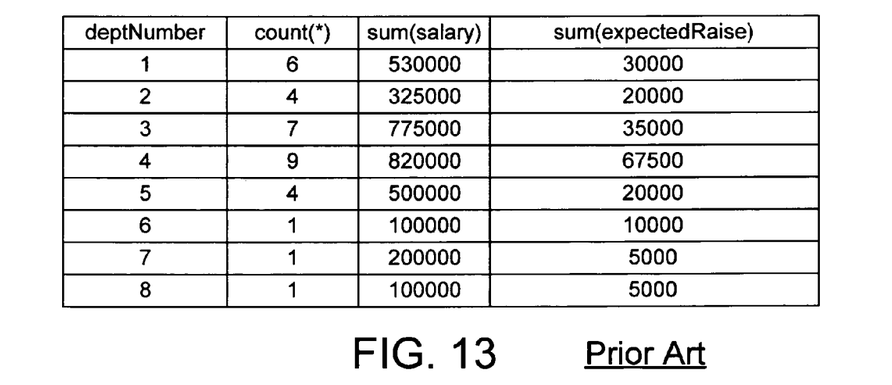
FIG. 13 is a block diagram of a prior art table of intermediate results for the query in FIG. 12.

When the query of FIG. 12 is processed using the prior art method 400 in FIG. 4, the SELECT clause is first processed to generate the intermediate results (step 420). Applying the SELECT clause in FIG. 12 to the tables in FIGS. 2 and 11 generates intermediate results as shown in the temporary table in FIG. 12. Note that for every department number, a join operation must be performed with a row from the personalInfoTable in FIG. 11. Thus, the intermediate results in FIG. 13 that include 8 rows are generated using 8 separate join operations. The HAVING clause is then applied to the intermediate results in FIG. 12 (step 430), resulting in the intermediate results shown in FIG. 14. Again, seven of the eight rows that were inserted into the intermediate results when processing the SELECT clause were deleted when later processing the HAVING clause. The intermediate results in FIG. 14 may then be processed to generate the final result set shown in FIG. 6. Because the expectedRaise column is not relevant to the query results, this column may be omitted from the final result set.

Figure 14:
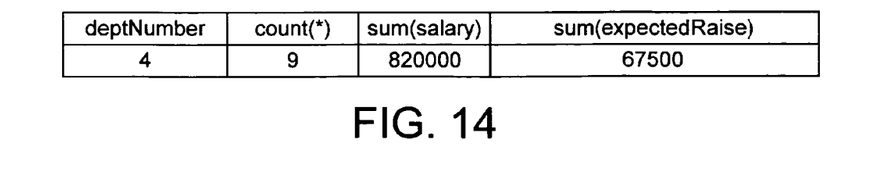
FIG. 14 is a block diagram of intermediate results for the query in FIG. 12 after applying the HAVING clause to the intermediate results in FIG. 13.

When the query of FIG. 12 is processed using method 900 in FIG. 9, the SELECT and HAVING clauses are both used to generate the intermediate results (step 920). As a consequence, the intermediate results generated in step 920 are shown in FIG. 14. Taking the HAVING clause into account when generating the intermediate results therefore reduces the number of required join operations from 8 to 1. The final result set may then be generated from the intermediate results (step 930). Again, because the expectedRaise column is not relevant to the query results, this column may be omitted from the final result set. The final result set is the same as shown in FIG. 6.

Figure 15:
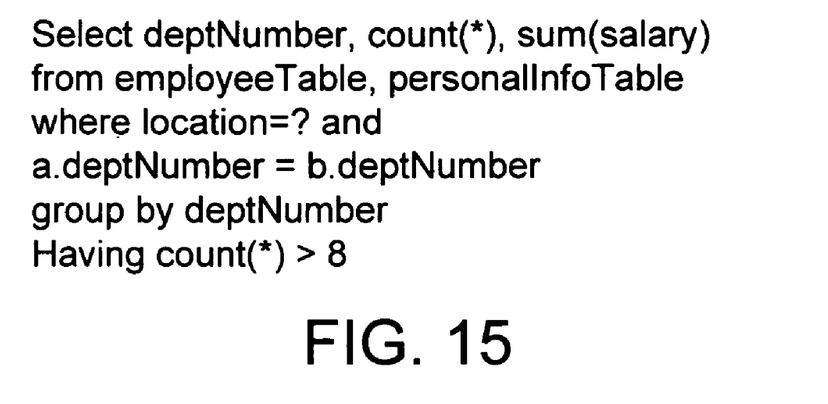
FIG. 15 is a third sample query.
Figure 16:
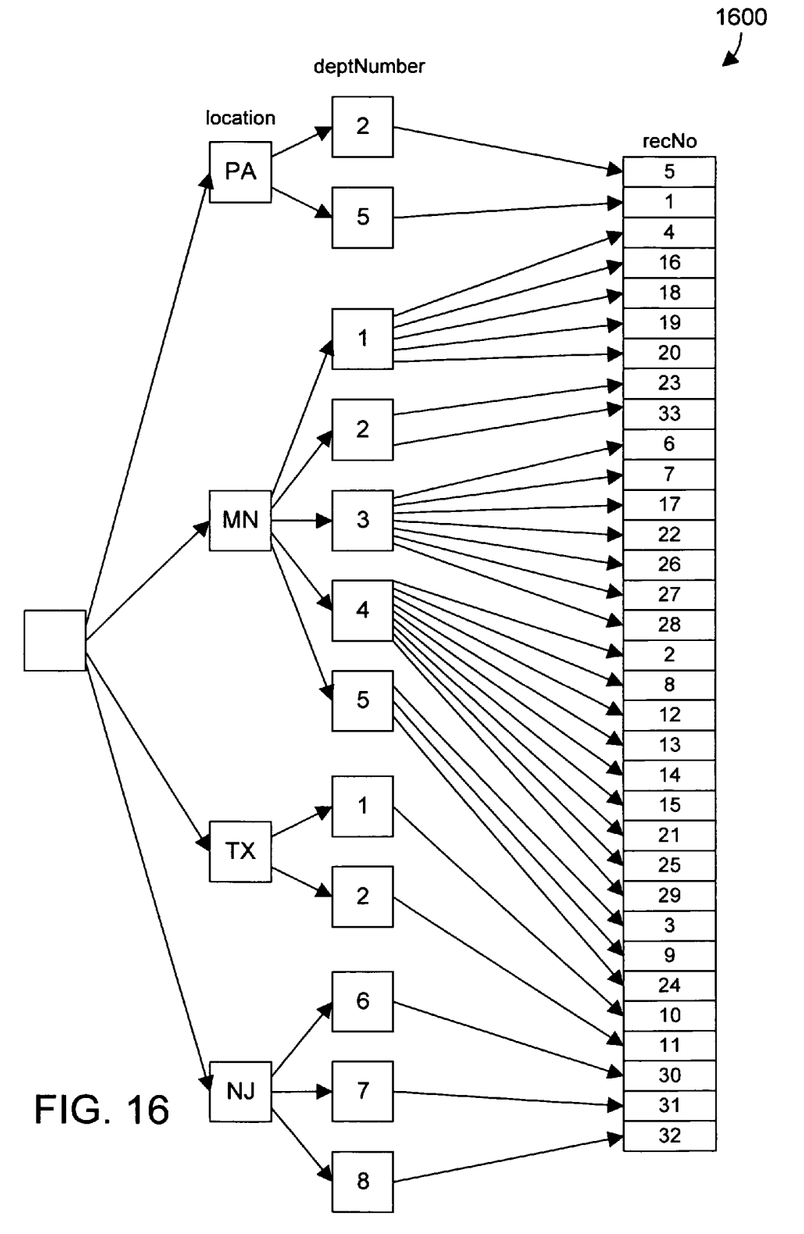
FIG. 16 is an index over the location and deptNumber columns for the table in FIG. 2.

A third example query in FIG. 15 is used to illustrate another benefit that arises from processing the SELECT clause and HAVING clause when generating the intermediate results. By processing both, an index may be used to process the query that wouldn't normally be used in the prior art. The query in FIG. 15 includes a "where location=?" clause. Referring to FIG. 16, an index 1600 over the location and deptNumber columns could be used in processing the SELECT clause of FIG. 15. However, we note that the only department number that has enough employees to satisfy the HAVING clause is in the MN location (Minnesota). The query processor can thus determine that the location is not relevant to the query results. As a result, a different index, such as index 800 in FIG. 8, could be used instead. As described above, the HAVING clause may be processed using the index 800 in FIG. 8 by skipping over index entries that do not satisfy the HAVING clause. Because department 4 is the only department with enough employees to satisfy the HAVING clause, the index entries for 1, 2, 3, 5, 6, 7 and 8 are skipped by the query processor. By skipping index entries that do not satisfy the HAVING clause, the query processor succeeds in generating intermediate results that satisfy both the SELECT clause and the HAVING clause, thereby eliminating the overhead of inserting rows into a temporary table only to delete them in the very next step when processing the HAVING clause.

Figure 8:
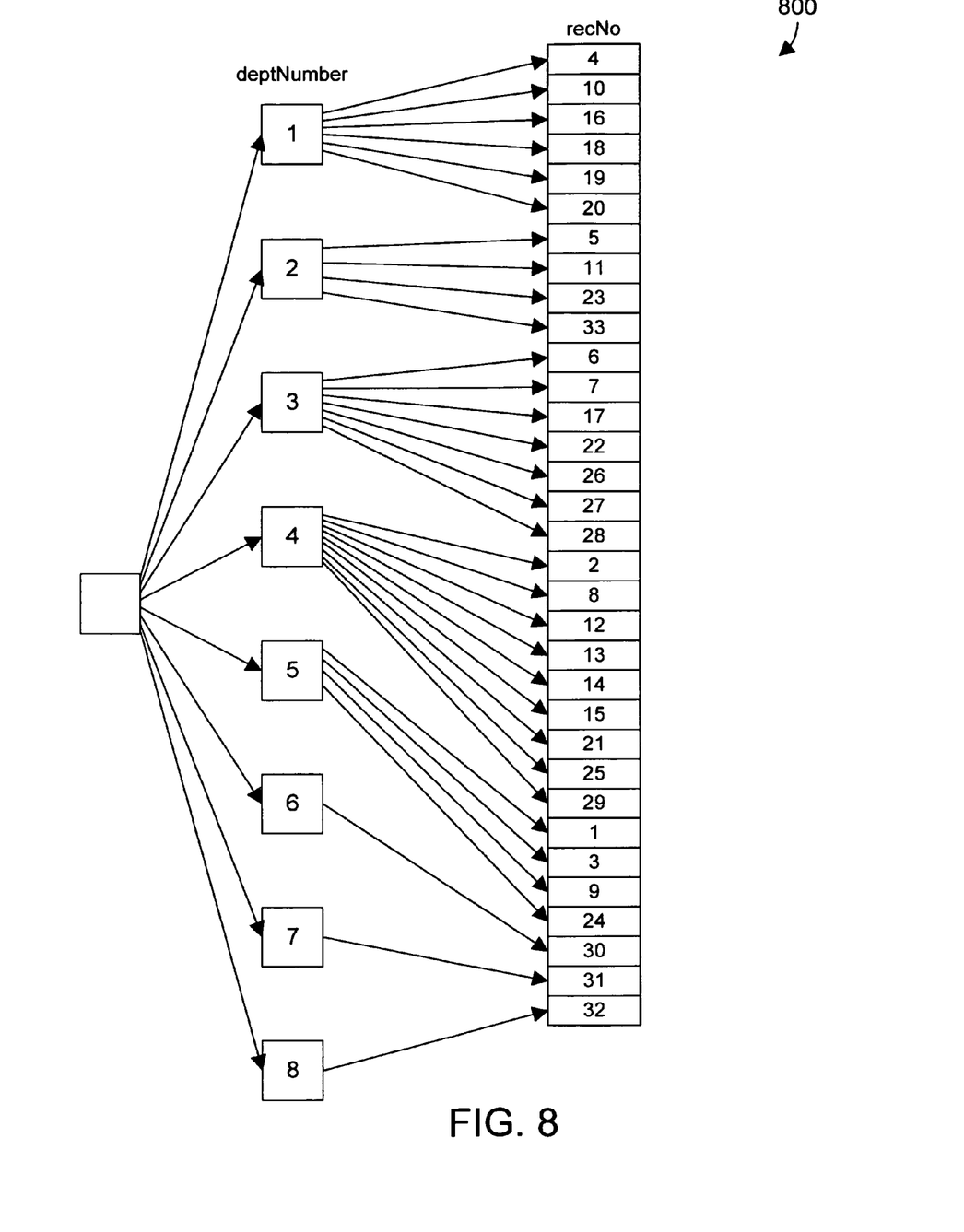
FIG. 8 is a block diagram of an index over the deptNumber column for the table in FIG. 2.

The discussion above regarding the processing of the query in FIG. 15 shows that the concept of which index is "suitable" differs between the prior art and the preferred embodiments. In the prior art method 700 in FIG. 7, index 1600 in FIG. 16 would be considered suitable to process the query in FIG. 15 in step 710, while index 800 in FIG. 8 would not be suitable. In contrast, in method 1000 of the preferred embodiments, both index 1600 in FIG. 16 and index 800 in FIG. 8 are deemed to be suitable indexes in step 1020, but index 800 is preferred because the query processor may determine from index 1600 that the location is not relevant to the query results. For this reason, the preferred embodiments allow using indexes in processing a query that would not be used in prior art methods.

The preferred embodiments process a query in a way that generates intermediate results that satisfy both the SELECT clause and the HAVING clause of the query. This prevents expending system resources to retrieve rows that satisfy the SELECT clause, only to throw them away when separately processing the HAVING clause, as is done in the prior art. The preferred embodiments thus provide enhanced system performance when processing queries with HAVING clauses.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   at least one processor;
   a memory coupled to the at least one processor;
   a database query residing in the memory that includes a SELECT clause and a HAVING clause; and
   a query processor residing in the memory and executed by the at least one processor, the query processor processing the database query and including only data that satisfies both the SELECT clause and the HAVING clause in a temporary table that holds intermediate results for the database query, wherein the temporary table never includes data that satisfies the SELECT clause without satisfying the HAVING clause and never includes data that satisfies the HAVING clause without satisfying the SELECT clause, wherein the query processor analyzes an index in generating the intermediate results, skips entries in the index that do not satisfy both the SELECT clause and the HAVING clause, and generates a final result set for the database query from the intermediate results in the temporary table.

2. A computer-implemented method for processing a database query that includes a SELECT clause and a HAVING clause, the method comprising the steps of:
   analyzing the database query;
   analyzing an index corresponding to the database query;
   skipping entries in the index that do not satisfy both the SELECT clause and the HAVING clause; and
   including only data that satisfies both the SELECT clause and the HAVING clause in a temporary table that holds intermediate results for the database query, wherein the temporary table never includes data that satisfies the SELECT clause without satisfying the HAVING clause and never includes data that satisfies the HAVING clause without satisfying the SELECT clause; and
   generating a final result set for the database query from the intermediate results in the temporary table.

3. A computer-readable program product comprising:
   (A) a query processor that processes a database query that includes a SELECT clause and a HAVING clause, the query processor including only data that satisfies both the SELECT clause and the HAVING clause in a temporary table that holds intermediate results for the database query, wherein the temporary table never includes data that satisfies the SELECT clause without satisfying the HAVING clause and never includes data that satisfies the HAVING clause without satisfying the SELECT clause, wherein the query processor analyzes an index in generating the intermediate results, skips entries in the index that do not satisfy both the SELECT clause and the HAVING clause, and generates a final result set for the database query from the intermediate results in the temporary table; and
   (B) recordable media bearing the query processor.

* * * * *